US012020718B2

(12) United States Patent
Bruhn et al.

(10) Patent No.: US 12,020,718 B2
(45) Date of Patent: Jun. 25, 2024

(54) METHODS AND DEVICES FOR GENERATING OR DECODING A BITSTREAM COMPRISING IMMERSIVE AUDIO SIGNALS

(71) Applicants: DOLBY INTERNATIONAL AB, Amsterdam Zuidoost (NL); DOLBY LABORATORIES LICENSING CORPORATION, San Francisco, CA (US)

(72) Inventors: Stefan Bruhn, Sollentuna (SE); Juan Felix Torres, Darlinghurst (AU)

(73) Assignees: DOLBY INTERNATIONAL AB, Amsterdam Zuidoost (NL); DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/251,940

(22) PCT Filed: Jul. 2, 2019

(86) PCT No.: PCT/US2019/040271
§ 371 (c)(1),
(2) Date: Dec. 14, 2020

(87) PCT Pub. No.: WO2020/010064
PCT Pub. Date: Jan. 9, 2020

(65) Prior Publication Data

US 2021/0375297 A1 Dec. 2, 2021

Related U.S. Application Data

(60) Provisional application No. 62/693,246, filed on Jul. 2, 2018.

(51) Int. Cl.
*G10L 19/16* (2013.01)
*G10L 19/008* (2013.01)
(Continued)

(52) U.S. Cl.
CPC .......... *G10L 19/167* (2013.01); *G10L 19/008* (2013.01); *G10L 19/18* (2013.01)

(58) Field of Classification Search
CPC ..... G10L 19/008; G10L 19/167; G10L 19/16; G10L 19/002; G10L 19/038; G10L 19/00;
(Continued)

(56) References Cited

U.S. PATENT DOCUMENTS

2004/0032960 A1 2/2004 Griesinger
2007/0162278 A1 7/2007 Miyasaka
(Continued)

FOREIGN PATENT DOCUMENTS

CN 105556597 A 5/2016
CN 105612577 A 5/2016
(Continued)

OTHER PUBLICATIONS

DolbyTM AC-4: Audio Delivery for Next-Generatin Entertainment Services, pp. 1-30, Jun. 2015.*
(Continued)

*Primary Examiner* — Leshui Zhang

(57) ABSTRACT

The present document describes a method (500) for generating a bitstream (101), wherein the bitstream (101) comprises a sequence of superframes (400) for a sequence of frames of an immersive audio signal (111). The method (500) comprises, repeatedly for the sequence of superframes (400), inserting (501) coded audio data (206) for one or more frames of one or more downmix channel signals (203) derived from the immersive audio signal (111), into data fields (411, 421, 412, 422) of a superframe (400); and
(Continued)

inserting (502) metadata (202, 205) for reconstructing one or more frames of the immersive audio signal (111) from the coded audio data (206), into a metadata field (403) of the superframe (400).

30 Claims, 3 Drawing Sheets

(51) Int. Cl.
*G10L 19/18* (2013.01)
*H04S 3/00* (2006.01)

(58) Field of Classification Search
CPC . G10L 19/02; G10L 19/18; H04S 3/02; H04S 3/008; H04S 3/00; H04N 19/107; G04S 2420/03; G04S 2420/11
USPC ................... 704/500–504; 381/1–23; 700/94
See application file for complete search history.

(56) References Cited

U.S. PATENT DOCUMENTS

| | | | | |
|---|---|---|---|---|
| 2011/0238426 | A1* | 9/2011 | Fuchs | G10L 19/028 704/500 |
| 2014/0226823 | A1 | 8/2014 | Sen | |
| 2015/0170657 | A1 | 6/2015 | Thompson | |
| 2015/0348558 | A1* | 12/2015 | Riedmiller | G10L 19/167 704/500 |
| 2018/0174594 | A1 | 6/2018 | Kim | |

FOREIGN PATENT DOCUMENTS

| | | | |
|---|---|---|---|
| CN | 105612766 | A | 5/2016 |
| CN | 107430863 | A | 12/2017 |
| JP | 2011008258 | A | 1/2011 |
| JP | 2016534669 | A | 11/2016 |
| JP | 2017501438 | A | 1/2017 |
| RU | 2450440 | C1 | 5/2012 |
| WO | 2005081229 | A1 | 9/2005 |
| WO | 2006022190 | A1 | 3/2006 |
| WO | 2011083849 | A1 | 7/2011 |
| WO | 2015184316 | A1 | 12/2015 |
| WO | 2016203994 | A1 | 12/2016 |
| WO | 2017132082 | A1 | 8/2017 |
| WO | 2019068638 | | 4/2019 |
| WO | 2019143867 | | 7/2019 |

OTHER PUBLICATIONS

ISO/IEC 23003-2, 1st Edition, Information Technology—MPEG Audio Technologies, Part 2: Spatial Audio Object Coding SAOC, standards, Oct. 1, pp. 1-138 (Year: 2010).*

McGrath, D. et al "Immersive Audio Coding for Virtual Reality Using a Metadata-assisted Extension of the 3GPP EVS Codec" ICASSP May 12, 2019, pp. 730-734.

Purnhagen, H. et al "Immersive Audio Delivery Using Joint Object Coding" AES Convention, May 2016.

Purnhagen, H. et al "Immersive Audio Delivery Using Joint Object Coding" AES Convention, May 2016, AES, pp. 1-6.

Rumsey, Francis "Immersive Audio: Objects, Mixing, and Rendering" J. Audio Engineering Society, vol. 64, No. 7/8, Jul./Aug. 2016.

Dolby, "Dolby AC-4: Audio Delivery for Next-Generation Entertainment Services" located via google Scholar, Jun. 2015.

Laitinen et al., Converting 5.1 Audio Recordings to B-Format for Directional Audio Coding Reproduction, Year 2011, 2011 IEEE International Conference on Acoustics, Speech and Signal Processing (ICASSP).

* cited by examiner

METHODS AND DEVICES FOR GENERATING OR DECODING A BITSTREAM COMPRISING IMMERSIVE AUDIO SIGNALS

CROSS-REFERENCE TO RELATED APPLICATIONS

This application claims the benefit of priority to U.S. Provisional Patent Application No. 62/693,246 filed on 2 Jul. 2018, which is hereby incorporated by reference.

TECHNICAL FIELD

The present document relates to immersive audio signals which may comprise soundfield representation signals, notably ambisonics signals. In particular, the present document relates to generating and decoding a bitstream comprising an immersive audio signal.

BACKGROUND

The sound or soundfield within the listening environment of a listener that is placed at a listening position may be described using an ambisonics signal. The ambisonics signal may be viewed as a multi-channel audio signal, with each channel corresponding to a particular directivity pattern of the soundfield at the listening position of the listener. An ambisonics signal may be described using a three-dimensional (3D) cartesian coordinate system, with the origin of the coordinate system corresponding to the listening position, the x-axis pointing to the front, the y-axis pointing to the left and the z-axis pointing up.

By increasing the number of audio signals or channels and by increasing the number of corresponding directivity patterns (and corresponding panning functions), the precision with which a soundfield is described may be increased. By way of example, a first order ambisonics signal comprises 4 channels or waveforms, namely a W channel indicating an omnidirectional component of the soundfield, an X channel describing the soundfield with a dipole directivity pattern corresponding to the x-axis, a Y channel describing the soundfield with a dipole directivity pattern corresponding to the y-axis, and a Z channel describing the soundfield with a dipole directivity pattern corresponding to the z-axis. A second order ambisonics signal comprises 9 channels including the 4 channels of the first order ambisonics signal (also referred to as the B-format) plus 5 additional channels for different directivity patterns. In general, an L-order ambisonics signal comprises $(L+1)^2$ channels including the $L^2$ channels of the (L−1)-order ambisonics signals plus $[L+1)^2-L^2]$ additional channels for additional directivity patterns (when using a 3D ambisonics format). L-order ambisonics signals for L>1 may be referred to as higher order ambisonics (HOA) signals.

An HOA signal may be used to describe a 3D soundfield independently from an arrangement of speakers, which is used for rendering the HOA signal. Example arrangements of speakers comprise headphones or one or more arrangements of loudspeakers or a virtual reality rendering environment. Hence, it may be beneficial to provide an HOA signal to an audio render, in order to allow the audio render to flexibly adapt to different arrangements of speakers.

Soundfield representation (SR) signals, such as ambisonics signals, may be complemented with audio objects and/or multi-channel signals, to provide an immersive audio (IA) signal. The present document addresses the technical problem of transmitting and/or storing IA signals, with high perceptual quality in a bandwidth efficient manner. In particular, the present document addresses the technical problem of providing an efficient bitstream which is indicative of an IA signal. The technical problem is solved by the independent claims. Preferred examples are described in the dependent claims.

SUMMARY

According to an aspect, a method for generating a bitstream is described, wherein the bitstream comprises a sequence of superframes for a sequence of frames of an immersive audio signal. The method comprises, repeatedly for the sequence of superframes, inserting coded audio data for one or more frames of one or more downmix channel signals derived from the immersive audio signal, into data fields of a superframe. Furthermore, the method comprises inserting metadata, notably coded metadata, for reconstructing one or more frames of the immersive audio signal from the coded audio data, into a metadata field of the superframe.

According to another aspect, a method for deriving data regarding an immersive audio signal from a bitstream is described, wherein the bitstream comprises a sequence of superframes for a sequence of frames of the immersive audio signal. The method comprises, repeatedly for the sequence of superframes, extracting coded audio data for one or more frames of one or more downmix channel signals derived from the immersive audio signal, from data fields of a superframe. Furthermore, the method comprises extracting metadata for reconstructing one or more frames of the immersive audio signal from the coded audio data, from a metadata field of the superframe.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to a further aspect, a superframe of a bitstream is described, wherein the bitstream comprises a sequence of superframes for a sequence of frames of an immersive audio signal. The superframe comprises data fields for coded audio data for one or more (notably for multiple) frames of one or more downmix channel signals, derived from the immersive audio signal. Furthermore, the superframe comprises a (single) metadata field for metadata adapted to reconstruct one or more (notably multiple) frames of the immersive audio signal from the coded audio data.

According to another aspect, an encoding device configured to generate a bitstream is described. The bitstream comprises a sequence of superframes for a sequence of frames of an immersive audio signal. The encoding device is configured to, repeatedly for the sequence of superframes, insert coded audio data for one or more (notably multiple) frames of one or more downmix channel signals derived from the immersive audio signal, into data fields of a superframe; and insert metadata for reconstructing one or more more (notably multiple) frames of the immersive audio signal from the coded audio data into a metadata field of the superframe.

According to a further aspect, a decoding device configured to derive data regarding an immersive audio signal from a bitstream, wherein the bitstream comprises a sequence of superframes for a sequence of frames of the immersive audio signal. The decoding device is configured to, repeatedly for the sequence of superframes, extract coded audio data for one or more (notably multiple) frames of one or more downmix channel signals derived from the immersive audio signal, from data fields a superframe; and extract metadata for reconstructing one or more (notably multiple) frames of the immersive audio signal from the coded audio data from a metadata field of the superframe.

It should be noted that the methods, devices and systems including its preferred embodiments as outlined in the present patent application may be used stand-alone or in combination with the other methods, devices and systems disclosed in this document. Furthermore, all aspects of the methods, devices and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows an example coding system;

DETAILED DESCRIPTION

As outlined above, the present document relates to efficient coding of immersive audio signals such as HOA signals, multi-channel and/or object audio signals, wherein notably HOA signals are referred to herein more generally as soundfield representation (SR) signals. Furthermore, the present document relates to the storage or the transmission of an immersive audio (IA) signal over a transmission network within a bitstream.

As outlined in the introductory section, an SR signal may comprise a relatively high number of channels or waveforms, wherein the different channels relate to different panning functions and/or to different directivity patterns. By way of example, an $L^{th}$-order 3D First Order Ambisonics (FOA) or HOA signal comprises $(L+1)^2$ channels. A First Order Ambisonics (FOA) signal is an Ambisonics signal of order L=1 comprising 4 channels. An SR signal may be represented in various different formats.

A soundfield may be viewed as being composed of one or more sonic events emanating from arbitrary directions around the listening position. By consequence the locations of the one or more sonic events may be defined on the surface of a sphere (with the listening or reference position being at the center of the sphere).

A soundfield format such as FOA or Higher Order Ambisonics (HOA) is defined in a way to allow the soundfield to be rendered over arbitrary speaker arrangements (i.e. arbitrary rendering systems). However, rendering systems (such as the Dolby Atmos system) are typically constrained in the sense that the possible elevations of the speakers are fixed to a defined number of planes (e.g. an ear-height (horizontal) plane, a ceiling or upper plane and/or a floor or lower plane). Hence, the notion of an ideal spherical soundfield may be modified to a soundfield which is composed of sonic objects that are located in different rings at various heights on the surface of a sphere (similar to the stacked-rings that make up a beehive).

Figure 1:
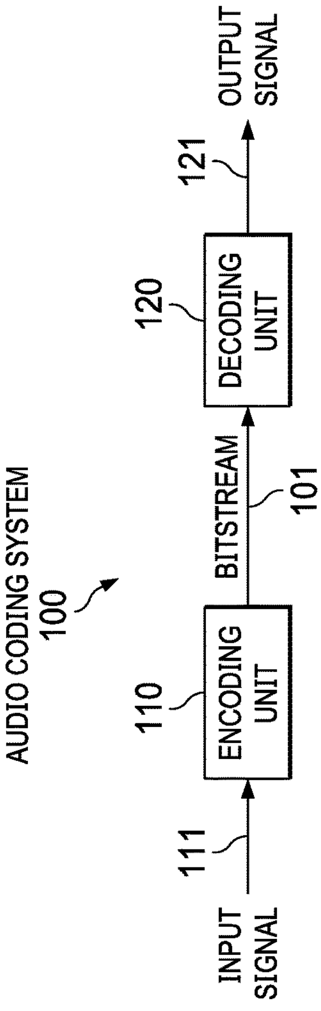

As shown in FIG. 1, an audio coding system 100 comprises an encoding unit 110 and a decoding unit 120. The encoding unit 110 may be configured to generate a bitstream 101 for transmission to the decoding unit 120 based on an input signal 111, wherein the input signal 111 may comprise or may be an immersive audio signal (used e.g. for Virtual Reality (VR) applications). The immersive audio signal 111 may comprise an SR signal, a multi-channel signal and/or a plurality of objects (each object comprising an object signal and object metadata). The decoding unit 120 may be configured to provide an output signal 121 based on the bitstream 101, wherein the output signal 121 may comprise or may be a reconstructed immersive audio signal.

Figure 2:
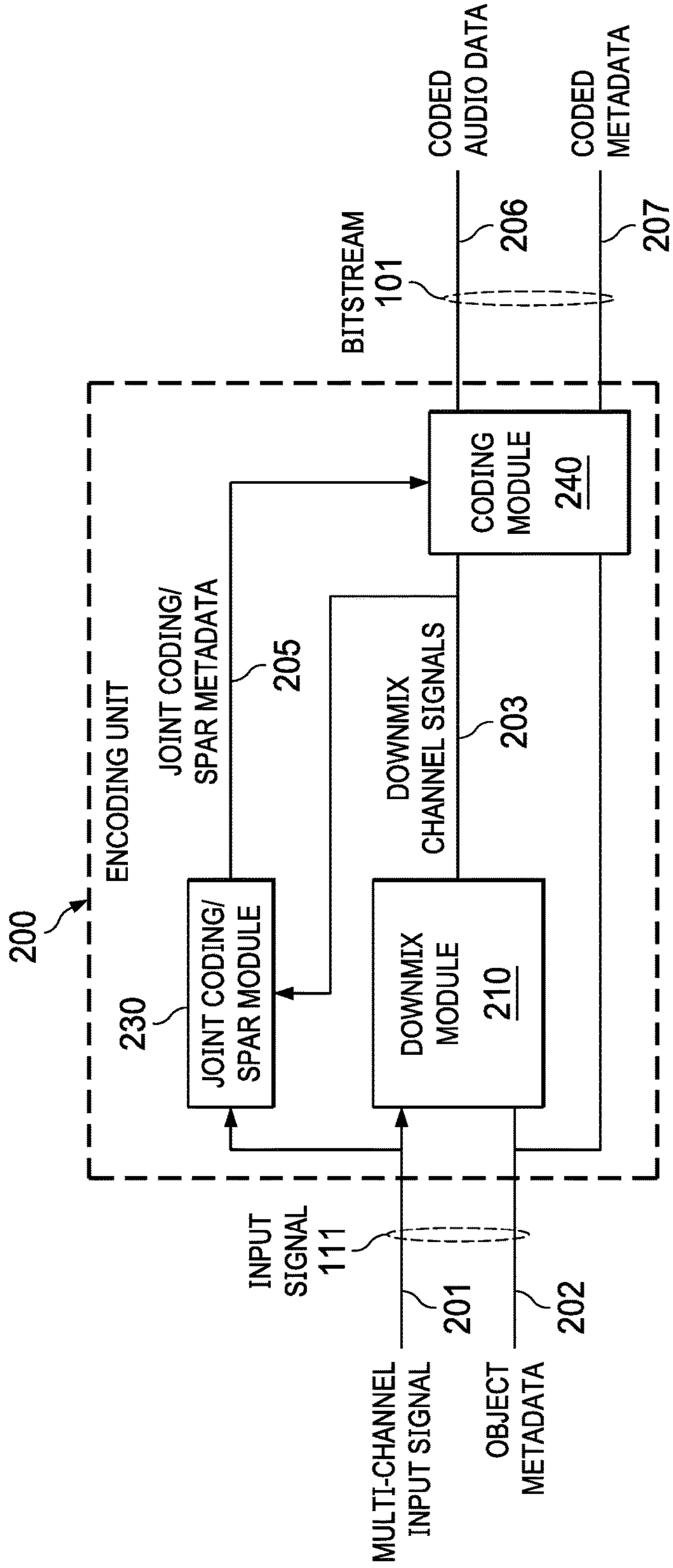
FIG. 2 shows an example encoding unit for encoding an immersive audio signal.

FIG. 2 illustrates an example encoding unit 110, 200. The encoding unit 200 may be configured to encode an input signal 111, where the input signal 111 may be an immersive audio (IA) signal 111. The IA signal 111 may comprise a multi-channel input signal 201. The multi-channel input signal 201 may comprise an SR signal and one or more object signals. Furthermore, object metadata 202 for the plurality of object signals may be provided as part of the IA signal 111. The IA signal 111 may be provided by a content ingestion engine, wherein a content ingestion engine may be configured to derive objects and/or a SR signal from (complex) IA content such as VR content that may comprise an SR signal, one or more multi-channel signals and/or one or more objects.

The encoding unit 200 comprises a downmix module 210 configured to downmix the multi-channel input signal 201 to a plurality of downmix channel signals 203. The plurality of downmix channel signals 203 may correspond to an SR signal, notably to a first order ambisonics (FOA) signal. Downmixing may be performed in the subband domain or QMF domain (e.g. using 10 or more subbands).

The encoding unit 200 further comprises a joint coding module 230 (notably a SPAR module), which is configured to determine joint coding metadata 205 (notably SPAR, Spatial Audio Resolution Reconstruction, metadata) that is configured to reconstruct the multi-channel input signal 201 from the plurality of downmix channel signals 203. The joint coding module 230 may be configured to determine the joint coding metadata 205 in the subband domain. In one example, the spatial audio reconstruction (SPAR) tool is a coding tool for improved coding of a relatively large number of audio channels and objects. To gain coding efficiency this tool supports the reconstruction of audio channels and objects out of a lower number of joint input audio channels and low overhead side information.

For determining the joint coding or SPAR metadata 205, the plurality of downmix channel signals 203 may be transformed into the subband domain and/or may be processed within the subband domain. Furthermore, the multichannel input signal 201 may be transformed into the subband domain. Subsequently, joint coding or SPAR metadata 205 may be determined on a per subband basis, notably such that by upmixing a subband signal of the plurality of downmix channel signals 203 using the joint coding or SPAR metadata 205, an approximation of a subband signal of the multi-channel input signal 201 is obtained. The joint coding or SPAR metadata 205 for the different subbands may be inserted into the bitstream 101 for transmission to the corresponding decoding unit 120.

In addition, the encoding unit 200 may comprise a coding module 240 which is configured to perform waveform encoding of the plurality of downmix channel signals 203, thereby providing coded audio data 206. Each of the downmix channel signals 203 may be encoded using a mono waveform encoder (e.g. 3GPP EVS encoding), thereby enabling an efficient encoding. Further examples for encoding the plurality of downmix channel signals 203 are MPEG AAC, MPEG HE-AAC and other MPEG Audio codecs, 3GPP codecs, Dolby Digital/Dolby Digital Plus (AC-3, eAC-3), Opus, LC-3 and other similar codecs. As a further example, coding tools comprised in the AC-4 codec may be configured to perform the operations of the encoding unit 200.

Furthermore, the coding module 240 may be configured to perform entropy encoding of the joint coding metadata (i.e. the SPAR metadata) 205 and of the object metadata 202, thereby providing coded metadata 207. The coded audio data 206 and the coded metadata 207 may be inserted into the bitstream 101. The bitstream 101 may exhibit the superframe structure which is described in the present document. The method 500 which is described in the present document may be performed by the coding module 240.

Figure 3:
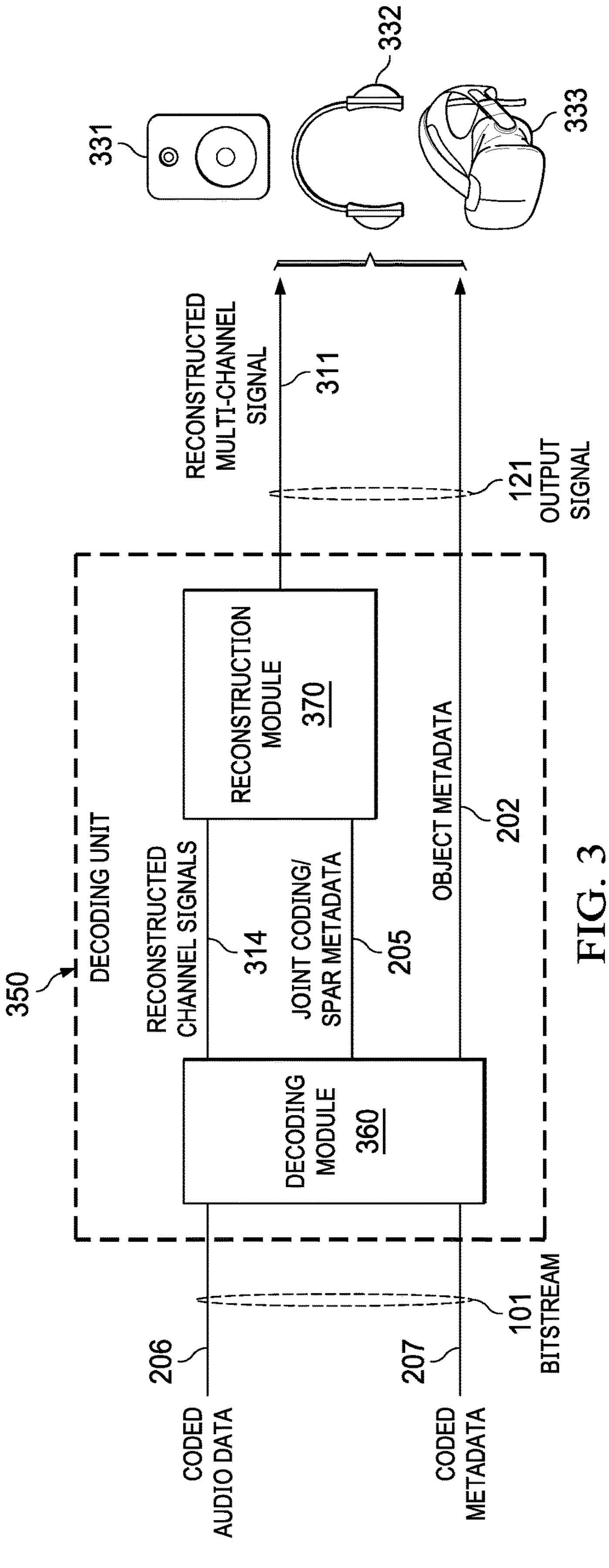
FIG. 3 shows another example decoding unit for decoding an immersive audio signal.

FIG. 3 shows an example decoding unit 120, 350. The decoding unit 120, 350 may include a receiver that receives the bitstream 101 which may include the coded audio data 206 and the coded metadata 207. The decoding unit 120, 350 may include a processor and/or de-multiplexer that demultiplexes the coded audio data 206 and the coded metadata 207 from the bitstream 101. The decoding unit 350 comprises a decoding module 360 which is configured to derive a plurality of reconstructed channel signals 314 from the coded audio data 206. The decoding module 360 may further be configured to derive the joint coding or SPAR metadata 205 and/or the object metadata 202 from the coded metadata 207. The method 600 which is described in the present document may be performed by the decoding module 360.

In addition, the decoding unit 350 comprises a reconstruction module 370 which is configured to derive a reconstructed multi-channel signal 311 from the joint coding or SPAR metadata 205 and from the plurality of reconstructed channel signals 314. The joint coding or SPAR metadata 205 may convey the time- and/or frequency-varying elements of an upmix matrix that allows reconstructing the multi-channel signal 311 from the plurality of reconstructed channel signals 314. The upmix process may be carried out in the QMF (Quadrature Mirror Filter) subband domain. Alternatively, another time/frequency transform, notably a FFT (Fast Fourier Transform)-based transform, may be used to perform the upmix process. In general, a transform may be applied, which enables a frequency-selective analysis and (upmix-) processing. The upmix process may also include decorrelators that enable an improved reconstruction of the covariance of the reconstructed multi-channel signal 311, wherein the decorrelators may be controlled by additional joint coding or SPAR metadata 205.

The reconstructed multi-channel signal 311 may comprise a reconstructed SR signal and one or more reconstructed object signals. The reconstructed multi-channel signal 311 and the object metadata may form an output signal 121 (also known as a reconstructed IA signal 121). The reconstructed IA signal 121 may be used for speaker rendering 331, for headphone rendering 332 and/or for rendering of e.g. VR content relying on a SR representation 333

Hence, an encoding unit 110, 200 is described which is configured to encode an IA input signal 111 into

- a downmix signal comprising a plurality of downmix channel signals 203, wherein the downmix signal 203 may be a soundfield representation (SR) signal; and
- metadata 202, 205 including SPAR or joint coding metadata 205 and/or object metadata 202 for one or more objects.

The metadata 202, 205, notably SPAR metadata 205, may exhibit a different temporal resolution than the downmix signal. In particular, the metadata 202, 205 may be used for a plurality of frames (e.g. for two frames) of the downmix signal. In view of this, a superframe may be defined for the bitstream 101, wherein the superframe comprises a plurality of frames of the downmix signal plus the metadata 202, 205 for the plurality of frames of the SR downmix signal.

Figure 4:
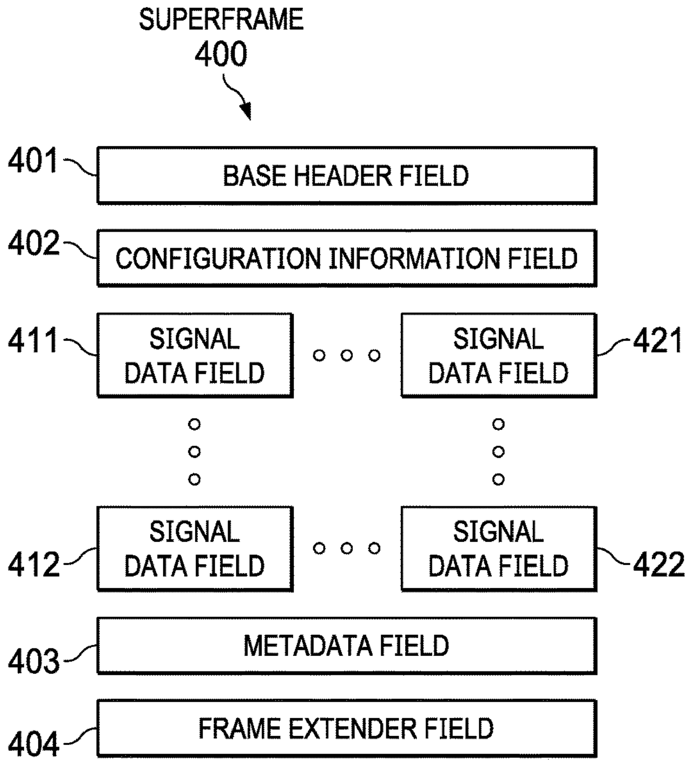
FIG. 4 shows an example superframe structure for an immersive audio signal, notably for coded data which is indicative of an immersive audio signal.

FIG. 4 shows an example superframe 400. The superframe 400 may comprise a base header (BH) field 401 and/or a configuration information (CI) field 402 which may comprise data that is valid for the entire superframe 400. Furthermore, the superframe 400 comprises signal data fields 411, 412, 421, 422 for the coded audio data 206 for one or more (notably for a plurality of) frames of the downmix signal. In particular, for each downmix channel signal 203 one or more (notably a plurality of) signal data fields 411, 412, 421, 422 may be provided, e.g. signal data fields 411, 421 for two frames of the first downmix channel signal 203 and signal data fields 412, 422 for two frames of the $N^{th}$ downmix channel signal 203. The signal data fields 411, 412, 421, 422 are also referred to herein as EVS bit fields (for the example that an EVS coder is used for encoding the downmix channel signals 203).

Furthermore, the superframe 400 comprises a metadata (MDF) field 403. The metadata field 403 may be configured to provide the SPAR or joint coding metadata 205 and/or predictive coefficients (PC). Hence, the metadata field 403 may be a SPAR bit field or a PC bit field (depending on the coding mode which is being used). In addition, the superframe 400 may comprise a frame extender (FE) field 404.

Hence, a superframe 400 may comprise signaling elements configured to

- indicate the one or more (EVS) codec modes which have been used for (EVS) coding of the N downmix channel signals; default may be N=4 channels, meaning that there are 4 (EVS) codec downmix channel signals W, X', Y', Z'.
- indicate the selected operation mode of the metadata-assisted (EVS) codec.
- indicate the metadata bitrate.
- provide the possibility to signal potential future extensions.

One or more signaling elements (such as the CI field 402) may only be provided conditionally inband within a superframe 400. If an optional or conditional signaling element is provided, this signaling element can be dynamically adapted and/or included within a superframe 400. One or more signaling elements may be kept static and/or may be provided only once, for instance as an out-of-band message. One or more signaling elements may be semi-dynamic, in which case the one or more signaling elements are provided inband only in selected superframes 400.

A superframe 400 may be designed to enable one or more of the following features:

- Full decoding and rendering of metadata-assisted EVS coded superframes.
- Partial mono decoding of metadata-assisted EVS coded superframes.
- Low-complexity extraction of superframe size information from a sequence of concatenated superframes, without the need for decoding the superframes, e.g. for placing the superframe size information into a secondary format (such as ISOBMFF, ISO base media file format) which provides or which requires this superframe size information.
- Low-complexity bit rate determination without the need for decoding the superframe data.
- Low-complexity feed-forward and skip of superframes without the need for decoding the superframe data.
- Low-complexity feed-backward without the need for decoding the superframe data (notably in case of constant bit rate operation).
- Simple re-sync and superframe skip in case of bit errors in arithmetic and/or entropy coded EVS and/or metadata bitstream portions.
- Editable superframes, which allows replacing metadata or EVS data frames.

A coded bit superframe 400 of the metadata-assisted EVS codec may correspond to a coding stride of 40 ms (e.g. comprising two frames of 20 ms). It may be composed of the following elementary bit fields:

- Base Header field (BH) 401: This field may carry a Configuration field Presence Indicator (CPI), a MetaData field size Adjustment indicator (MDA) and an Extension Indicator (EI). The CPI may indicate whether or not the Configuration Information (CI) field is supplied in the present superframe 400. The MDA may signal the difference between the signaled maximum metadata frame size and the actual metadata frame size. The EI may signal whether or not the superframe 400 is extended by a Frame Extender (FE) 404.
- Configuration Information field (CI) 402: This field may carry signaling information related to the configurations of the EVS, SPAR and Predictive Coefficient coding tools, which have been used, such as frame type (coding mode), bit rate and other configuration parameters that are described within the present document.
- EVS bit fields 411, 421, 412, 422: Each field may carry the bits of a single EVS frame (notably without the EVS payload header), as specified in 3GPP TS 26.445: "Codec for Enhanced Voice Services (EVS); Detailed algorithmic description", section 7, which is incorporate herein by reference.
- SPAR bit field (SPAR) 403: This field may carry the bits of a single SPAR metadata frame, possibly zero-padded at the end to make it byte-aligned.
- Predictive Coefficient bit field (PC) 403: This field may carry the bits of a single predictive coefficient metadata frame, possibly zero-padded at the end to make it byte-aligned.
- Frame Extender (FE) 404: This field may be defined for future use and may carry extension data. Except for a size element contained in the FE, any other data carried by the FE may be reserved for future use (RFU).

All elementary bit fields may be byte-aligned and—if necessary—zero-padded at the end up to their defined size.

The above mentioned elementary fields may be included within a (single) superframe 400 in the following sequence order. A superframe may comprise

- One Base Header (BH) 401 containing
  - The Configuration field Presence Indicator (CPI),
  - The Metadata field size adjustment indicator (MDA) and
  - The Extension Indicator (EI).
- One optional Configuration Information field (CI) 402. The presence of the CI field 402 may be signaled by the CPI.
- The data of N EVS encoded downmix channel signals Si, SN, two successive frames for each downmix channel signal, which may be carried by 2*N elementary EVS bit fields 411, 421, 412, 422 (referred to herein as EVS(.)). In default operation with 4 downmix channel signals, there are 8 successive EVS bit fields 411, 421, 412, 422 representing two frames of the downmix channel signals W, X', Y', Z'.
- One metadata frame (MDF) field 403, for SPAR or predictive coefficients, hence being
  - One elementary SPAR bit field, or
  - One elementary PC bit field.
- One optional Frame Extender (FE) 404. The presence of the FE field may be indicated by the EI.

Table 1 indicates an example structure of a superframe 400.

TABLE 1

| Bits (MSB-LSB) | Name | Description |
|---|---|---|
| 8 | BH | Base Header, containing CPI, MDA, EI |
| Variable | CI | Configuration Information field (optional, depending on CPI) |
| Variable | EVS ($S_{1, 1}$) | EVS frame data for a first frame of 1st dmx channel |
| Variable | EVS ($S_{2, 1}$) | EVS frame data for a first frame of 2nd dmx channel |
| Variable | EVS ($S_{\ldots, 1}$) | . . . |
| Variable | EVS ($S_{N, 1}$) | EVS frame data for a first frame of $N^{th}$ dmx channel |
| Variable | EVS ($S_1$, 2) | EVS frame data for a second frame of 1st dmx channel |
| Variable | EVS ($S_2$, 2) | EVS frame data for a second frame of 2nd dmx channel |
| Variable | EVS ($S_{\ldots, 2}$) | . . . |
| Variable | EVS ($S_N$, 2) | EVS frame data for a second frame of $N^{th}$ dmx channel |
| Variable | MDF | Metadata frame containing either a SPAR or a PC field |
| Variable | FE | Frame Extender (optional, depending on EI) |

In a default situation, there are 4 EVS coded downmix channel signals. The superframe structure for the default situation is shown in table 2.

TABLE 2

| Bits (MSB-LSB) | Name | Description |
|---|---|---|
| 8 | BH | Base Header, containing CPI, MDA, EI |
| 72 | CI | Configuration Information field (optional, depending on CPI) |
| Variable | EVS (W(1)) | EVS frame data for a first frame of signal W |
| Variable | EVS (X'(1)) | EVS frame data for a first frame of signal X' |
| Variable | EVS (Y'(1)) | EVS frame data for a first frame of signal Y' |

TABLE 2-continued

| Bits (MSB-LSB) | Name | Description |
|---|---|---|
| Variable | EVS (Z'(1)) | EVS frame data for a first frame of signal Z' |
| Variable | EVS(W(2)) | EVS frame data for a second frame of signal W |
| Variable | EVS (X'(2)) | EVS frame data for a second frame of signal X' |
| Variable | EVS (Y'(2)) | EVS frame data for a second frame of signal Y' |
| Variable | EVS (Z'(2)) | EVS frame data for a second frame of signal Z' |
| Variable | MDF | Metadata frame containing either a SPAR or a PC field |
| Variable | FE | Frame Extender (optional, depending on EI) |

Further details regarding the different elementary bit fields are provided below:

The Base Header (BH) field 401 may carry a Configuration field Presence Indicator (CPI), a MetaData field size Adjustment indicator (MDA) and an Extension Indicator (EI). This byte-field may always be the first element in a superframe 400.

The structure of the BH field 401 is shown in table 3.

TABLE 3

| Bits (MSB-LSB) | Name | Description |
|---|---|---|
| 1 | CPI | Configuration field Presence Indicator |
| 6 | MDA | MetaData field size Adjustment |
| 1 | EI | Extension Indicator |

The Configuration field Presence Indicator (CPI) may be a single bit used to signal the presence of the Configuration Information (CI) field in the present superframe 400. The CPI may have the following meaning:

CPI='0': This indicates that the Configuration Information field is not provided in the present superframe 400. It should be noted that the Configuration Information may instead be provided as static out-of-band information or from the most recent previously received superframe 400 carrying the Configuration Information field 402.

CPI='1': This indicates that the Configuration Information field is provided in the present superframe 400. The configuration information which is provided within the CI field 402 is valid for this superframe 400 and for any future superframe 400 until the next superframe 400 carrying the Configuration Information field 402 is provided.

The MetaData field size Adjustment indicator (MDA) may be provided directly subsequent to the CPI bit. This 6-bit indicator may signal the difference between the length of the MDF 403 as signaled by the MDR element (which is defined further down) and the actual size of the MDF 403. Using the MDA as an index, the indicated difference may be derived from the look-up shown in table 4. The series of adjustment values in table 4 is specified in Matlab style: start-value:step-size:end-value. The non-constant adjustment parameter step sizes shown in table 4 may be designed following an approximative model of the distribution of the total entropy code length of the metadata. This allows minimizing the number of unused bits in the MDF 403 and thus the transmission overhead.

TABLE 4

| | MDA | | | | | |
|---|---|---|---|---|---|---|
| | 0 . . . 47 | 48 . . . 55 | 56 . . . 59 | 60 . . . 61 | 62 | 63 |
| Adjustment value | 0:1:47 | 49:2:63 | 67:4:79 | 87:8:95 | 111 | 143 |

Depending on the maximum MDF size, the adjustment value represents single-byte or two-byte units. For maximum MDF sizes up to 275 bytes, the adjustment value represents single-byte units, otherwise two-byte units.

The MDA indicator may be followed by a single Extension Indicator bit (EI). If this bit is set to 1, the present superframe 400 is appended by a Frame Extender (FE) element.

The optionally provided Configuration Information (CI) field 402 may carry the following signaling elements as illustrated in table 5. The CI field 402 may consists of or may comprise 8 bytes of data (for the case of two EVS frames per downmix channel signal and N=4 downmix channels).

TABLE 5

| Bits (MSB-LSB) | Name | Description |
|---|---|---|
| 3 | N-I | Indicator for number of EVS codec downmix channels |
| 1 | MDT | Metadata Type indication |
| 11 | MDC | Metadata Coding configuration |
| 5 | MDR | Metadata bit rate signaling |
| 3 | BND | Number of metadata coding bands |
| 1 | RES | Reserved for future use |
| 6 | FT-1, 1 | EVS FT for first frame of 1st dmx channel |
| 6 | FT-2, 1 | EVS FT for first frame of 2nd dmx channel |
| 6 | . . . | . . . |
| 6 | FT-N, 1 | EVS FT for first frame of Nth dmx channel |
| 6 | FT-1, 2 | EVS FT for second frame of 1st dmx channel |
| 6 | FT-2, 2 | EVS FT for second frame of 2nd dmx channel |
| 6 | . . . | . . . |
| 6 | FT-N, 2 | EVS FT for second frame of Nth dmx channel |
| variable | zero-pad | Zero-Padding to fill up byte |

Table 6 illustrates the optional Configuration Information field 402 for the default case with 4 EVS coded downmix channel signals. In this case the CI field consists of 9 bytes of data.

TABLE 6

| Bits (MSB-LSB) | Name | Description |
|---|---|---|
| 3 | N-I | '011' indicating 4 EVS codec downmix channels |
| 1 | MDT | Metadata Type indication |
| 11 | MDC | Metadata Coding configuration |
| 5 | MDR | Metadata bit rate signaling |
| 3 | BND | Number of metadata coding bands |
| 1 | RES | Reserved for future use |
| 6 | FT-1, 1 | EVS FT for coding of W(1) |
| 6 | FT-2, 1 | EVS FT for coding of X'(1) |
| 6 | FT-3, 1 | EVS FT for coding of Y'(1) |
| 6 | FT-4, 1 | EVS FT for coding of Z'(1) |
| 6 | FT-1, 2 | EVS FT for coding of W(2) |
| 6 | FT-2, 2 | EVS FT for coding of X'(2) |
| 6 | FT-3, 2 | EVS FT for coding of Y'(2) |
| 6 | FT-4, 2 | EVS FT for coding of Z'(2) |

The Indicator for the Number N of EVS coded downmix channel signals (N–I) may be a 3-bit element that encodes the number N of EVS coded downmix channel signals. N is obtained from the indicator N–I by incrementing the number represented by the 3-bit element by 1. For achieving the default operation with 4 EVS downmix channel signals, the N–I element may be set to 3 ('011').

The Metadata Type indication (MDT) bit may have the following meaning:

MDT='0': indicates that the MDF carries a PC bit field.

MDT='1': indicates that the MDF carries a SPAR bit field.

The MetaData Coding configuration field (MDC) may comprise either configuration information of the used Predictive Coefficient tool or of the SPAR coding tool, depending on the indication of the MDT bit. The MDC field may be a 11-bit element of the CI field 402.

The meaning of its bits may depend on the MDT bit of the CI field 402. Depending on the value of the MDT bit, the MDC bits may have the following meaning:

MDT='0': If the MDT bit is zero, the 3 MSBs of the MDC encode a configuration parameter of the predictive coefficient coding scheme. The remaining 8 bits of the MDC are unused and zero-padded. The structure and content of the MDC field in this case is shown in table 7a.

MDT='1': If the MDT bit is one, the 11 MDC bits encode the SPAR codec configuration as illustrated in table 7b. The HOA order may be calculated by incrementing hoa_order_idx by 1.

Table 7a

| Bits (MSB-LSB) | Name | Description | Value range |
|---|---|---|---|
| 3 | coding_strategy_idx | Index into Huffman Table | 0-7 |
| 8 | Zero-padding | | |

Table 7a

| Bits (MSB-LSB) | Name | Description | Value range |
|---|---|---|---|
| 4 | $n_{obj}$ | Number of audio objects | 1-15 |
| 2 | hoa_order_idx | Identifier for HOA order | 0-2 |
| 2 | $n_{deco}$ | Number of decorrelators | 0-3 |
| 3 | coding_strategy_idx | Index into Huffman Table | 0-7 |

The MetaData Bit rate signalling field (MDR) may comprise 5 bits and may be used to encode the maximum size of the MDF. The maximum MDF size may be obtained by a table look-up using table 8, wherein the MDR value is an index of table 8. Furthermore, table 8 indicates the (maximum) metadata bit rate in kbps. In table 8, the actual MDF size is signaled as the maximum MDF size minus the adjustment number/value indicated by the MDA (from the BH field 401). This allows signaling of the actual MDF size with fine resolution (typically with byte resolution). It should also be noted that any unused bit in the MDF may be zero-padded, which may happen in case the actual MDF size provides more space than needed for the coded metadata.

TABLE 8

| MDR value | Metadata bit rate (kbps) | Maximum MDF size (bytes) |
|---|---|---|
| 0 | 4 | 20 |
| 1 | 5 | 25 |
| 2 | 6 | 30 |
| 3 | 7 | 35 |
| 4 | 8 | 40 |
| 5 | 10 | 50 |
| 6 | 12 | 60 |
| 7 | 15 | 75 |
| 8 | 18 | 90 |
| 9 | 21 | 105 |
| 10 | 24 | 120 |
| 11 | 28 | 140 |
| 12 | 32 | 160 |
| 13 | 36 | 180 |
| 14 | 40 | 200 |
| 15 | 42 | 210 |
| 16 | 45 | 225 |
| 17 | 47 | 235 |
| 18 | 50 | 250 |
| 19 | 55 | 275 |
| 20 | 60 | 300 |
| 21 | 65 | 325 |
| 22 | 70 | 350 |
| 23 | 75 | 375 |
| 24 | 80 | 400 |
| 25 | 85 | 425 |
| 26 | 90 | 450 |
| 27 | 95 | 475 |
| 28 | 100 | 500 |
| 29 | 105 | 525 |
| 30 | 110 | 550 |
| 31 | 128 | 640 |

The Band Number field (BND) may be a 3-bit number and may indicate the number of subbands used in metadata coding. The band number is derived from the BND value by means of a look-up within table 9. In default operation, the BND field may be set to 5 ('101'), which indicates 12 subbands.

TABLE 9

| BND (3 bits) | Number of bands |
|---|---|
| 0 | 1 |
| 1 | 3 |
| 2 | 5 |
| 3 | 7 |
| 4 | 9 |
| 5 | 12 |
| 6 | 15 |
| 7 | 23 |

The use of the Reserved bit (RES) may be reserved for future use. In default operations this bit may be set to '0' and may be ignored by a receiver.

The EVS FT field (FT-x,y) may represent the EVS frame type (FT) which is applied for coding of the $y^{th}$ frame of the $x^{th}$ downmix channel signal, wherein x=1 . . . N and wherein y=1,2. The EVS frame type may be as defined in 3GPP TS 26.445, section A2.2.1.2, which is incorporated herein by reference. It should be noted that the last EVS FT field in the CI field 402 may be followed by up to 7 zero-padding bits, which ensures octet-alignment. In case the last EVS FT field ends octet-aligned, no zero-padding bits are appended. Zero-padding bits shall be ignored by a receiver.

The elementary EVS bit fields 411, 421, 412, 422 may be defined as specified in 3GPP TS 26.445, section 7, (which is incorporated herein by reference) for the respectively used EVS coding mode. As specified in the cited reference, no extra signaling bits are defined as part of the elementary EVS frame field to indicate the bit rate or the EVS operation mode. This information may be part of the optional CI field 402 of the current or of a previous superframe 400 or may also be provided out-of-band.

The detailed allocation of the coefficients for SPAR metadata is shown table 10. Table 10 shows the order of the bits as they are inserted within a frame. Note that the most significant bit (MSB) of each parameter is always inserted first. As each field is dynamically quantized, the bit allocation is variable.

TABLE 10

| Name | Description | Encoding |
|---|---|---|
| obj_pos | Matrix of object positions | Position-dependent quantization |
| Mspar | HOA SPAR reconstruction matrix | Huffman coded |
| Pspar | SPAR matrix | Huffman coded |

The detailed allocation of the coefficients for PC metadata is shown table 11. Table 11 shows the order of the bits as they are inserted within a superframe 400. Note that the most significant bit (MSB) of each parameter is always inserted first. As each field is dynamically quantized, the bit allocation is variable.

TABLE 11

| Name | Description | Encoding |
|---|---|---|
| Gfoa | Matrix of predictive coefficients | Huffman coded |

The Frame Extender (FE) element 404 typically carries in its first two bytes a 16-bit unsigned integer number that indicates the size of the FE field 404 in bytes. This element is referred to as the FE-size. The FE-size number is hence greater or equal to 2. The content and meaning of the remaining FE-data part of the FE field 404 may be reserved for future use. In default operation the FE-size element may be parsed and the FE-data element may be skipped and ignored. The structure and content of the FE field 404 is shown in table 12.

TABLE 12

| Bits (MSB-LSB) | Name | Description |
|---|---|---|
| 16 | FE-size | Size of FE field |
| variable | FE-data | data bits carried in FE field |

Hence, a superframe structure is described, which enables signaling of configuration information of a metadata-assisted EVS codec. The superframe structure enables a receiver to decode metadata-assisted EVS codec data.

On a general level, the metadata-assisted EVS codec is a multi-mode and/or multi-rate coding system. The underlying EVS codec may be configured to operate at a multitude of different coding modes and/or bit rates. Furthermore, the spatial metadata codec may offer various different coding modes and/or bit rates. The spatial metadata codec makes use of entropy coding which typically results in a non-constant bit rate. This means that the actually used bit rate is typically lower than a given target bit rate. For certain frames this bit rate undershoot may be smaller and for some other frames it may be larger.

For the decoder 120 to be able to decode the transmitted bitstream 101 properly, the exact coding mode and bitrate used by the encoder 110 may be provided. For the entropy coded portion of the metadata, the exactly used bitrate may not be required, because the used Huffman codes are commaless and uniquely decodable. Nevertheless, a receiver of the bitstream 101 may be provided with the number of bits used for coding of a frame (or superframe 400). This is for instance desirable if the decoder 120 needs to skip a number of received frames without having to decode these frames. In the present document, a superframe structure has been described that supports the following features:

- Decoding of the full frame.
- Decoding only the part necessary for mono reproduction.
- Extracting length information from the frame 400, to put it into a secondary format (ISOBMFF) that provides and/or needs this information.
- In a concatenation of frames 400, decoding only part way in, and skipping the first few frames efficiently.
- If there is a bit error, finding the next frame start (resynch).
- Determining the bitrate quickly and efficiently, without having to decode the frames.
- Editing the frames (replacing metadata, or parts of the EVS frames)).
- Fast feed forward operation without decoding of frames.
- Supporting efficient carriage of constant and variable length codec data payloads.

In addition, the superframe structure is described to contain all necessary signaling elements to

- indicate the EVS codec modes (incl. bit rates) used for EVS coding of the N downmix channel signals. The default may be N=4, meaning that there are 4 EVS codec downmix channels W, X', Y', Z'.
- indicate the selected operation mode of the assist metadata codec.
- indicate the metadata bitrate at high resolution without significant signaling overhead.
- provide the possibility to signal potential future extensions.

Certain of the signaling elements of a superframe 400 may not change frequently during a coding session or are even static. Some other signaling elements like the metadata bitrate may change from superframe to superframe. For that reason, certain signaling elements are only conditionally provided inband in a superframe 400 (such as the CI field 402). If they are provided, these signaling elements can be dynamically adapted on a superframe basis. There is also the possibility to keep these signaling elements static and to provide them only once, for instance as an out-of-band message. The signaling elements may also be semi-dynamic, in which case they are provided inband only in certain superframes.

Regarding the signaling of the metadata bit rate, the main challenge is that the number of required bits (or bytes) per superframe 400 may vary within a relatively large range. Signaling only the maximum possible number of bits per frame may leave a relatively high number of bits unused, in case the entropy code is significantly shorter than the maximum length. On the other hand, providing a direct signaling element for the indication of the actually used number of bits (or bytes) in a superframe 400 would require a relatively large number of signaling bits. In the present document, a scheme is described that keeps the number of signaling bits for the actually used number of bits (or bytes) within a superframe 400 at a minimum, while still allowing to cover a relatively large range of possible metadata bit rates.

From a system perspective, superframes 400 of the metadata-assisted EVS codec are generated at an encoding head-end. This may be a server in a network having access to uncoded immersive or VR (Virtual Reality) audio data. It may also be a mobile phone capturing immersive audio signals. The encoded frames 400 may be inserted into a file that is downloaded to a receiving terminal or transmitted according to a streaming protocol like DASH (Dynamic Adaptive Streaming over HTTP) or RTSP/RTP (Real-Time Streaming Protocol/Real-time Transport Protocol). If the encoded superframes 400 are stored in a file, the superframes 400 may be inserted into a file formatted according to ISOBMFF. In case certain configuration information is static and in case it is not transmitted as part of a superframe 400, it may instead be provided from the encoding end to the decoding end by out-of-band means like the session description protocol (SDP).

The schemes outlined in the present document may make use of an EVS codec as underlying codec and may provide the multi-mode/multi-rate messages (frame type) inband in a superframe 400 or out-of-band using e.g. SDP. This may be combined with a multi-mode immersive metadata coding frame work that can be configured efficiently with a set of configuration parameters that can also be transmitted inband or out-of-band. Furthermore, there is a possibility to combine multi-mode immersive metadata coding with a scheme allowing associated maximum bit rates (or number of bits in a frame/superframe) inband or out-of-band.

The superframe structure described in the present document signals the actually used metadata field size as a maximum number (that is optionally signaled out-of-band) minus an adjustment parameter for which an indication is transmitted as part of each superframe 400. The coding of the adjustment parameters is preferably performed in non-constant step sizes, which allows to cover an increased range of possible adjustments using a reduced number of signaling bits for the adjustment parameters. Furthermore, the non-constant adjustment parameter step sizes may be designed using an approximative model of the distribution of the total entropy code length of the metadata. This allows minimizing the number of unused bits in the metadata field and thus minimizing the transmission overhead. In addition, overhead for metadata bit rate (size) may be signaled, while keeping the number of unused bits in the metadata field at a minimum. Thus, the overall transmission bit rate is reduced.

The configuration information (CI) within the CI field 402 may relate to selected EVS frame types for EVS coding of four downmix channel signals W, X', Y', Z'. The configuration information may further relate to (i) the selected operation mode of the metadata-assisted EVS code, FOA or HIQ; (ii) bit rate of SPAR metadata in case of HIQ operation; (iii) bit rate of prediction coefficient metadata in case of FOA operation. Indication if the configuration information may be (1) dynamic and provided inband together with the payload; (2) semi-dynamic and provided inband together with a previous payload; or (3) static and provided out-of-band as a hex-string together with the codec attribute of the DASH adaptation sets.

FOA (First Order Ambisonics) mode is a low bit rate operation mode (operating e.g. at −128 kbps) that relies on predictive coefficient metadata. FOA exhibits typically a relatively limited quality due to relatively low spatial resolution. HIQ (High Immersive Quality) mode is a medium to high-rate operation mode (operating e.g. at 128-512 kbps). It relies on SPAR metadata and is capable of offering very high immersive quality as it aims at reconstructing the original SR signal.

Figure 5:
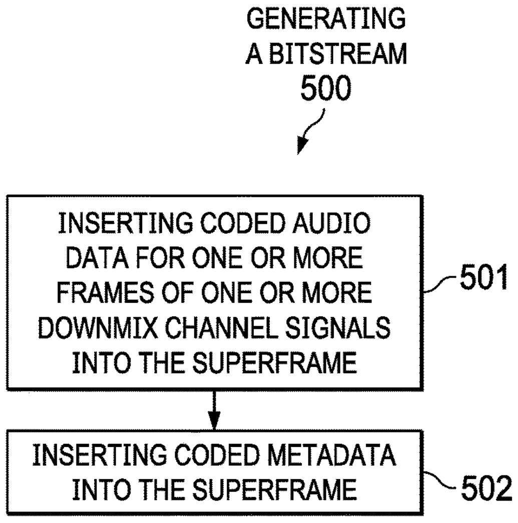
FIG. 5 shows a flow chart of an example method for generating a bitstream comprising a sequence of superframes indicative of an immersive audio signal.

FIG. 5 shows a method 500 for generating a bitstream 101, wherein the bitstream 101 comprises a sequence of superframes 400 for a sequence of (basic) frames of an immersive audio signal 111. The immersive audio (IA) signal 111 may comprise a soundfield representation (SR) signal which may describe a soundfield at a reference position. The reference position may be the listening position of a listener and/or the capturing position of a microphone. The SR signal may comprise a plurality of channels (or waveforms) for a plurality of different directions of arrival of the soundfield at the reference position. Alternatively, or in addition, the IA signal 111 may comprise one or more audio objects and/or a multi-channel signal.

The IA signal 111, notably the SR signal comprised within the IA signal, may comprise or may be an L-order ambisonics signal, with L greater than or equal to 1. Alternatively, or in addition, the SR signal may exhibit a beehive (BH) format with the plurality of directions of arrival being arranged in a plurality of different rings on a sphere around the reference position. The plurality of rings may comprise a middle ring, an upper ring, a lower ring and/or a zenith. Alternatively, or in addition, the SR signal may exhibit an intermediate spatial format, referred to as ISF, notably the ISF format as defined within the Dolby Atmos technology.

Hence, an IA signal 111 may comprise a plurality of different channels. Each channel comprised within the IA signal 111 typically comprises a sequence of audio samples for a sequence of time instants or for a sequence of frames. In other words, the "signals" described in the present document typically comprise a sequence of audio samples for a corresponding sequence of time instants or frames (e.g. at a temporal distance of 20 ms or less).

The method 500 may comprise extracting one or more audio objects from the IA signal 111. An audio object typically comprises an object signal (with a sequence of audio samples for the corresponding sequence of time instants or frames). Furthermore, an audio object typically comprises object metadata 202 indicating a position of the audio object. The position of the audio object may change over time, such that the object metadata 202 of an audio object may indicate a sequence of positions for the sequence of time instants or frames.

Furthermore, the method 500 may comprise determining a residual signal based on the IA signal 111 and based on the one or more audio objects. The residual signal may describe the original IA signal from which the one or more audio objects 103, 303 have been extracted and/or removed. The residual signal may be the SR signal comprised within the IA signal 111. Alternatively, or in addition, the residual signal may comprise or may be a multi-channel audio signal and/or a bed of audio signals. Alternatively, or in addition, the residual signal may comprise a plurality of audio objects at fixed object locations and/or positions (e.g. audio objects which are assigned to particular speakers of a defined arrangement of speakers).

In addition, the method 500 may comprise generating and/or providing a downmix signal based on the IA signal 111 (e.g. using the downmix module 210). The number of channels of the downmix signal is typically smaller than the number of channels of the IA signal 111. Furthermore, the method 500 may comprise determining joint coding or SPAR metadata 205 which enables upmixing of the downmix signal (i.e. the one or more downmix channel signals 203) to object signals of one or more reconstructed audio objects for the corresponding one or more audio objects. Furthermore, the joint coding or SPAR metadata 205 may enable upmixing of the downmix signal to a reconstructed residual signal for the corresponding residual signal.

The downmix signal comprising one or more downmix channel signals 203, the SPAR metadata 205 and the object metadata 202 may be inserted into a bitstream 101. In particular, the method 500 may comprise performing waveform coding of the downmix signal to provide coded audio data 206 for a sequence of frames of the one or more downmix channel signals 203. Waveform coding may be performed using e g Enhanced Voice Services (EVS) coding. Furthermore, the method 500 may comprise performing entropy coding of the SPAR metadata 205 and/or of the object metadata 202 of the one or more audio objects to provide the (coded) metadata 207 to be inserted into the bitstream 101.

The method 500 may comprise, repeatedly for the sequence of superframes 400, inserting 501 coded audio data 206 for one or more (notably multiple) frames (e.g. for two or more frames) of the one or more downmix channel signals 203 derived from the immersive audio signal 111, into data fields 411, 421, 412, 422 of a superframe 400. The (basic) frame of a downmix channel signal 203 may span 20 ms of the downmix channel signal 203. The superframe 400 may span a multiple of the length of the (basic) frame, e.g. 40 ms.

Furthermore, the method 500 may comprise inserting 502 metadata 202, 205 (notably the coded metadata 207) for reconstructing one or more (notably multiple) frames of the immersive audio signal 111 from the coded audio data 206, into a (single) metadata field 403 of the superframe 400. Hence, a superframe 400 may provide metadata 202, 205 for one or more (notably multiple) frames of the one or more downmix channel signals 203, thereby enabling an efficient transmission of an IA signal 111.

In particular, a frame of a downmix channel signal 203 may be generated using a multi-mode and/or multi-rate speech or audio codec. Furthermore, the metadata 202, 205 may be generated using a multi-mode and/or multi-rate immersive metadata coding scheme. Configuration information indicative of the operation of the multi-mode and/or multi-rate speech or audio codec (which has been used for the downmix channel signal 203) and/or of the operation of the multi-mode and/or multi-rate immersive metadata coding scheme may be comprised in a configuration information field 402 of the (current) superframe 400, may be comprised in a configuration information field 402 of a previous superframe 400 of the sequence of superframes 400 or may be conveyed using an out-of-band signaling scheme. As a result of this, an efficient and flexible scheme for encoding an immersive audio signal 111 may be provided.

The superframe 400 may comprise coded audio data 206 associated with a plurality of downmix channel signals 203. The coded audio data 206 of a frame of a first downmix channel signal 203 may be generated using a first instance of a multi-mode and/or multi-rate speech or audio codec. Furthermore, the coded audio data 206 of a frame of a second downmix channel signal 203 may be generated using a second instance of a multi-mode and/or multi-rate speech or audio codec, wherein the first and the second instances of the multi-mode and/or multi-rate speech or audio codec may be different. The configuration information (comprised within the current superframe 400, a previous superframe 400 or conveyed out-of-band) may be indicative of the operation of the first and the second instances (notably of each instance) of the multi-mode and/or multi-rate speech or audio codec. By doing this, the flexibility and efficiency for encoding an immersive audio signal 111 may be further increased.

In other words, the method 500 may comprise inserting coded audio data 206 for one or more frames of a first downmix channel signal 203 and a second downmix channel signal 203 derived from the immersive audio signal 111, into one or more first data fields 411, 421 and one or more second data fields 412, 422 of the superframe 400, respectively. The first downmix channel signal 203 may be encoded using a first (audio or speech) encoder, and the second downmix channel signal may be encoded using a second (audio or speech) encoder. The first and second encoder may be different or may be operated using a different configuration. Furthermore, the method 500 may comprise providing configuration information regarding the first encoder and the second encoder within the superframe 400, within a previous superframe 400 of the sequence of superframes 400 or using an out-of-band signaling scheme. By doing this, the flexibility and efficiency for encoding an immersive audio signal 111 may be further increased.

The method 500 may comprise inserting a header field 401 into the superframe 400. The header field 401 may be indicative of the size of the metadata field 403 of the superframe 400, thereby enabling the size of a superframe 400 to be adapted in a flexible manner to varying lengths of (entropy and/or lossless encoded) metadata 207.

The metadata field 403 may exhibit a maximum possible size (which may e.g. be indicated within an optional configuration information field 402 of the superframe 400). The header field 401 may be indicative of an adjustment value, and the size of the metadata field 403 of the superframe 400 may correspond to the maximum possible size minus the adjustment value, thereby enabling the size of the metadata field 403 to be signaled in a precise and efficient manner.

The header field 401 may comprise a size indicator (e.g. the adjustment value) for the size of the metadata field 403. The size indicator may exhibit a different resolution or step size (with regards to the size intervals) for different size ranges of the size of the metadata field 403. The resolution and/or step size of the size indicator may be dependent on the statistical size distribution of the (entropy encoded) metadata. By providing a size indicator with varying resolution, the bit rate efficiency for signaling the size of the metadata field 403 may be improved.

The header field 401 may be indicative of whether or not the superframe 400 comprises a configuration information field 402. In other words, the header filed 401 may be indicative of the presence of a configuration information field 402. The configuration information field 402 may only be inserted into a superframe 400 if needed (e.g. if the configuration of the encoder of the IA signal 111 has changed). As a result of this, the bit rate efficiency of the sequence of superframes 400 may be improved.

The header field 401 may be indicative that no configuration information field 402 is present within a current superframe 400. The method 500 may comprise conveying configuration information in a previous superframe 400 of the sequence of superframes 400 or using an out-of-band signaling scheme. As a result of this, configuration information (which is at least temporarily static) may be transmitted in an efficient manner.

Alternatively, or in addition, the header field 401 may be indicative of whether or not the superframe 400 comprises an extension field 404 for additional information regarding the immersive audio signal 111. As a result of this, the superframe structure may be adapted in a flexible manner to future extensions.

The method 500 may comprise inserting a configuration information field 402 into the superframe 400 (if needed). The configuration information field 402 may be indicative of the number of downmix channel signals 203 comprised within the data fields 411, 421, 412, 422 of the superframe 400. Alternatively, or in addition, the configuration information field 402 may be indicative of an order of the soundfield representation signal comprised within the IA signal 111. As a result of this, various different types of IA signals 111 (with various different types of SR signals) may be encoded and transmitted.

The configuration information field 402 may be indicative of a maximum possible size of the metadata field 403. Alternatively, or in addition, the configuration information field 402 may be indicative of a frame type and/or a coding mode used for coding each one of the one or more downmix channel signals 203. The provision of this information enables the use of different coding schemes for encoding an IA signal 111.

The coded audio data 206 of a frame of a downmix channel signal 203 may be generated using a multi-mode and/or multi-rate speech or audio codec. Alternatively, or in addition, the (coded) metadata 207 may be generated using a multi-mode and/or multi-rate immersive metadata coding scheme. As a result of this, IA signals 111 may be encoded at relatively high quality and at relatively low data rates.

A superframe 400 of the sequence of superframes 400 may constitute at least a part of a data element transmitted using a transmission protocol, notably DASH, RTSP or RTP, or stored in a file according to a storage format, notably ISOBMFF. In other words, the bitstream 101 comprising the sequence of superframes 400 may make use of one or more data elements of a transmission protocol or of a storage format. Thereby enabling the bitstream 101 to be transmitted or stored in an efficient and reliable manner.

Figure 6:
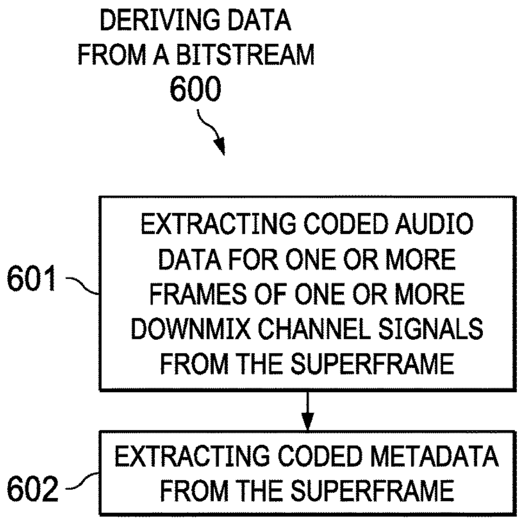
FIG. 6 shows a flow chart of an example method for extracting information from a bitstream comprising a sequence of superframes indicative of an immersive signal.

FIG. 6 shows a flow chart of an example method 600 for deriving data regarding an immersive audio signal 111 from a bitstream 101. The bitstream 101 comprises a sequence of superframes 400 for a sequence of frames of the immersive audio signal 111. In a preferred example, multiple (basic) frames of the IA signal 111 are comprised within a single superframe 400. It should be noted that all features described in the context of a method 500 for generating a bitstream 101 are applicable in an analogous manner for the method 600 for deriving data from a bitstream 101.

The IA signal 111 may comprise an SR signal, a multichannel signal and/or one or more audio objects. The aspects and/or features which are described in the context of the method 500 and/or in the context of the encoding device 110 are also applicable in an analogous and/or complementary manner for the method 600 and/or for the decoding device 120 (and vice versa).

The method 600 comprises, repeatedly for the sequence of superframes 400, extracting 601 coded audio data 206 for one or more (notably multiple) frames of one or more downmix channel signals 203 derived from the immersive audio signal 111, from data fields 411, 421, 412, 422 of a superframe 400. Furthermore, the method 600 comprises extracting 602 (coded) metadata 207 for reconstructing one or more (notably multiple) frames of the immersive audio signal 111 from the coded audio data 206 from a metadata field 403 of the superframe 400.

The method 600 may comprise deriving one or more reconstructed audio objects from the coded audio data 206 and from the metadata 207 (notably from the object metadata 202). As indicated above, an audio object typically comprises an object signal and object metadata 202 which indicates the (time-varying) position of the audio object. Furthermore, the method 600 may comprise deriving a reconstructed residual signal from the coded audio data 206 and from the metadata 202, 205. The one or more reconstructed audio objects and the reconstructed residual signal may describe and/or may be indicative of the IA signal 111. In particular, data (such as the order of an SR signal comprised within the IA signal 111) may be extracted from the bitstream 101, which enables the determination of the reconstructed IA signal 121, wherein the reconstructed IA signal 121 is an approximation of the original IA signal 111.

As indicated above, the method 600 for deriving data regarding an immersive audio signal 111 from a bitstream 101 may comprise corresponding features to the method 500 for generating a bitstream 101. In particular, the method 600 may comprise extracting a header field 401 from a given superframe 400. The size of the metadata field 403 of the given superframe 400 may be derived from the header field 401.

The size of the metadata field 403 may be indicated as outlined in the context of method 500. The metadata field 403 may exhibit a maximum possible size, and the header field 401 may be indicative of an adjustment value, wherein the size of the metadata field 403 of the superframe 400 may correspond to the maximum possible size minus the adjustment value. In particular, the header field 401 may comprise a size indicator for the size of the metadata field 403, wherein the size indicator may exhibit a different resolution for different size ranges of the size of the metadata field 403. As a result of this, the size of the metadata filed 403 may be signaled in a bit-rate efficient manner.

The method 600 may comprise determining, based on the header field 401, whether or not the superframe 400 comprises a configuration information field 402 and/or whether a configuration information field 402 is present within the superframe 400. If no configuration information field 402 is present, configuration information which has been provided within a previous superframe 400 and/or which has been provided out of band may be used for processing the one or more frames of the one or more downmix channel signals 203 comprised within the superframe 400. If a configuration information field 402 is present, then the configuration information comprised within the superframe 400 may be used for processing the one or more frames of the one or more downmix channel signals 203 comprised within the superframe 400.

In addition, the method 600 may comprise determining, based on the header field 401, whether or not the superframe 400 comprises an extension field 404 for additional information regarding the immersive audio signal 111, thereby providing an efficient and flexible means for transmitting information within the bitstream 101.

The method 600 may comprise extracting a configuration information field 402 from the superframe 400. Furthermore, the method 600 may comprise determining, based on the configuration information field 402, the number of downmix channel signals 203 represented by the data fields 411, 421, 412, 422 of the superframe 400, thereby enabling a precise processing of the one or more frames of the one or more downmix channel signals 203 comprised within the superframe 400.

Furthermore, the method 600 may comprise determining, based on the configuration information field 402, the maximum possible size of the metadata field 403.

In addition, the method 600 may comprise determining, based on the configuration information field 402, the order of the immersive audio signal 111, for enabling a precise reconstruction of the IA signal 111.

The method 600 may also comprise determining, based on the configuration information field 402, a frame type and/or a coding mode used for coding each one of the one or more downmix channel signals, thereby enabling a precise processing of the one or more frames of the one or more downmix channel signals 203 comprised within the superframe 400.

Various example embodiments of the present invention may be implemented in hardware or special purpose circuits, software, logic or any combination thereof. Some aspects may be implemented in hardware, while other aspects may be implemented in firmware or software, which may be executed by a controller, microprocessor or other computing device. In general, the present disclosure is understood to also encompass an apparatus suitable for performing the methods described above, for example an apparatus (spatial renderer) having a memory and a processor coupled to the memory, wherein the processor is configured to execute instructions and to perform methods according to embodiments of the disclosure.

While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller, or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present invention include a computer program product comprising a computer program tangibly embodied on a machine-readable medium, in which the computer program containing program codes configured to carry out the methods as described above.

In the context of the disclosure, a machine-readable medium may be any tangible medium that may contain, or store, a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention, or of what may be claimed, but rather as descriptions of features that may be specific to particular embodiments of particular inventions. Certain features that are described in this specification in the context of separate embodiments may also may be implemented in combination in a single embodiment. Conversely, various features that are described in the context of a single embodiment may also may be implemented in multiple embodiments separately or in any suitable sub-combination.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It is claimed:

1. A method for generating a bitstream; wherein the bitstream comprises a sequence of superframes for a sequence of frames of an ambisonic immersive audio signal; wherein the method comprises, repeatedly for the sequence of superframes, inserting coded audio data for two or more frames of one or more downmix channel signals derived from the ambisonic immersive audio signal, into data fields of a superframe in the sequence of superframes in the bitstream, wherein each frame in the two or more frames in the superframe is coded with a respective data field designated to support frame level re-synchronization operations by a recipient device of the ambisonic immersive audio signal in case of bit errors in the ambisonic immersive audio signal; and inserting metadata for reconstructing one or more frames of the ambisonic immersive audio signal from the coded audio data into a metadata field of the superframe.

2. The method of claim 1, wherein a. the method comprises inserting a header field into the superframe; and b. the header field is indicative of a size of the metadata field of the superframe.

3. The method of claim 2, wherein
a. the metadata field has a data size no greater than a maximum size;
b. the header field is indicative of an adjustment value; and
c. the size of the metadata field of the superframe corresponds to the maximum size minus the adjustment value.

4. The method of claim 2, wherein
a. the header field comprises a size indicator for the size of the metadata field; and
b. the size indicator exhibits a different resolution for different size ranges of the size of the metadata field.

5. The method of claim 4, wherein
a. the metadata for reconstructing the one or more frames of the ambisonic immersive audio signal exhibits a statistical size distribution of the size of the metadata; and
b. the resolution of the size indicator is dependent on the size distribution of the metadata.

6. The method of claim 1, wherein
a. the method comprises inserting a header field into the superframe; and
b. the header field is indicative of whether or not the superframe comprises a configuration information field, and/or
c. the header field is indicative of the presence of a configuration information field.

7. The method of claim 1, wherein
a. the method comprises inserting a configuration information field into the superframe; and
b. the configuration information field is indicative of a number of downmix channel signals represented by the data fields of the superframe.

8. The method of claim 1, wherein
a. the method comprises inserting a configuration information field into the superframe; and
b. the configuration information field is indicative of a maximum size of the metadata field.

9. The method of claim 1, wherein
a. the method comprises inserting a configuration information field into the superframe; and
b. the configuration information field is indicative of an order of a soundfield representation signal comprised within the ambisonic immersive audio signal.

10. The method of claim 1, wherein
a. the method comprises inserting a configuration information field into the superframe; and
b. the configuration information field is indicative of a frame type and/or a coding mode used for coding each one of the one or more downmix channel signals.

11. The method of claim 1, wherein
a. the method comprises inserting a header field into the superframe; and
b. the header field is indicative of whether or not the superframe comprises an extension field for additional information regarding the ambisonic immersive audio signal.

12. The method of claim 1, wherein
a. the coded audio data of a frame of a downmix channel signal is generated using a multi-mode and/or multi-rate speech or audio codec; and/or
b. the metadata is generated using a multi-mode and/or multi-rate immersive metadata coding scheme.

13. The method of claim 1, wherein the coded audio data of a frame of a downmix channel signal is encoded using an Enhanced Voice Services encoder.

14. The method of claim 1, wherein the superframe constitutes at least a part of a data element transmitted using a transmission protocol, notably DASH, RTSP or RTP, or stored in a file according to a storage format, notably ISOBMFF.

15. The method of claim 1, wherein
a. a header field is indicative that no configuration information field is present; and
b. the method comprises conveying configuration information in a previous superframe of the sequence of superframes or using an out-of-band signaling scheme.

16. The method of claim 1, wherein the one or more downmix channels signals include a first downmix channel signal and a second downmix channel signal; wherein the first downmix channel signal and the second downmix channel signal are derived from the ambisonic immersive audio signal; wherein the first downmix channel signal is encoded using a first encoder, and wherein the second downmix channel signal is encoded using a second encoder; wherein the method comprises providing configuration information regarding the first encoder and the second encoder
within the superframe, within a previous superframe of the sequence of superframes or using an out-of-band signaling scheme.

17. The method of claim 1, wherein the method comprises
a. extracting one or more audio objects from the immersive audio, referred to as IA, signal; wherein an audio object comprises an object signal and object metadata indicating a position of the audio object;
b. determining a residual signal based on the IA signal and based on the one or more audio objects;
c. providing a downmix signal based on the IA signal, notably such that a number of downmix channel signals of the downmix signal is smaller than a number of channel signals of the IA signal;
d. determining joint coding metadata for enabling upmixing of the downmix signal to one or more reconstructed audio object signals corresponding to the one or more audio objects and/or to a reconstructed residual signal corresponding to the residual signal;
e. performing waveform coding of the downmix signal to provide coded audio data for a sequence of frames of the one or more downmix channel signals; and
f. performing entropy coding of the joint coding metadata and of the object metadata of the one or more audio objects to provide the metadata to be inserted into the metadata fields of the sequence of superframes.

18. A method for deriving data regarding an ambisonic immersive audio signal from a bitstream; wherein the bitstream comprises a sequence of superframes for a sequence of frames of the ambisonic immersive audio signal; wherein the method comprises, repeatedly for the sequence of superframes,
a. extracting coded audio data for two or more frames of one or more downmix channel signals derived from the ambisonic immersive audio signal, from data fields of a superframe in the sequence of superframes in the bitstream, wherein each frame in the two or more frames in the superframe is coded with a respective data field designated to support frame level re-synchronization operations by a recipient device of the ambisonic immersive audio signal in case of bit errors in the ambisonic immersive audio signal; and b. extracting metadata for reconstructing one or more frames of the immersive ambisonic audio signal from the coded audio data from a metadata field of the superframe.

19. The method of claim 18, further comprising a. deriving one or more reconstructed audio objects from the coded audio data and from the metadata; wherein an audio object comprises an object signal and object metadata indicating a position of the audio object; and b. deriving a reconstructed residual signal from the coded audio data and from the metadata; wherein the one or more reconstructed audio objects and the reconstructed residual signal describe the ambisonic immersive audio signal.

20. The method of claim 18, wherein the method comprises a. extracting a header field from the superframe; and b. deriving a size of the metadata field of the superframe from the header field.

21. The method of claim 20, wherein a. the metadata field has a data size no greater than a maximum size;

b. the header field is indicative of an adjustment value; and c. the size of the metadata field of the superframe corresponds to the maximum size minus the adjustment value.

22. The method of claim 20, wherein a. the header field comprises a size indicator for the size of the metadata field; and b. the size indicator exhibits a different resolution for different size ranges of the size of the metadata field.

23. The method of claim 20, wherein the method comprises a. extracting a header field from the superframe; and b. determining, based on the header field, whether or not the superframe comprises a configuration information field; and/or c. determining, based on the header field, whether a configuration information field is present within the superframe.

24. The method of claim 20, wherein the method comprises a. extracting a configuration information field from the superframe; and b. determining, based on the configuration information field, a number of downmix channel signals represented by the data fields of the superframe.

25. The method of claim 20, wherein the method comprises a. extracting a configuration information field from the superframe; and b. determining, based on the configuration information field, a maximum size of the metadata field.

26. The method of claim 20, wherein the method comprises a. extracting a configuration information field from the superframe; and b. determining, based on the configuration information field, an order of a soundfield representation signal comprises within the ambisonic immersive audio signal.

27. The method of claim 18, wherein the method comprises a. extracting a configuration information field from the superframe; and b. determining, based on the configuration information field, a frame type and/or a coding mode used for coding each one of the one or more downmix channel signals.

28. The method of claim 18, wherein the method comprises a. extracting a header field from the superframe; and b. determining, based on the header field, whether or not the superframe comprises an extension field for additional information regarding the ambisonic immersive audio signal.

29. An encoding device configured to generate a bitstream; wherein the bitstream comprises a sequence of superframes for a sequence of frames of an ambisonic immersive audio signal;

wherein the encoding device is configured to, repeatedly for the sequence of superframes, a. insert coded audio data for two or more frames of one or more downmix channel signals derived from the ambisonic immersive audio signal, into data fields of a superframe in the sequence of superframes in the bitstream, wherein each frame in the two or more frames in the superframe is coded with a respective data field designated in the superframe to support frame level re-synchronization operations by a recipient device of the ambisonic immersive audio signal in case of bit errors in the ambisonic immersive audio signal; and b. insert metadata for reconstructing one or more frames of the ambisonic immersive audio signal from the coded audio data into a metadata field of the superframe.

30. A decoding device configured to derive data regarding an ambisonic immersive audio signal from a bitstream; wherein the bitstream comprises a sequence of superframes for a sequence of frames of the ambisonic immersive audio signal; wherein the decoding device is configured to, repeatedly for the sequence of superframes, a. extract coded audio data for two or more frames of one or more downmix channel signals derived from the ambisonic immersive audio signal, from data fields of a superframe in the sequence of superframes in the bitstream, wherein each frame in the or more frames in the superframe is coded with a respective data field designated to support frame level re-synchronization operations by a recipient device of the ambisonic immersive audio signal in case of bit errors in the ambisonic immersive audio signal; and b. extract metadata for reconstructing one or more frames of the ambisonic immersive audio signal from the coded audio data from a metadata field of the superframe.

* * * * *